United States Patent [19]

Kaiser

[11] Patent Number: 5,497,162
[45] Date of Patent: Mar. 5, 1996

[54] RADAR SIGNAL SELECTION BASED UPON ANTENNA BEARING

[75] Inventor: Stephen G. Kaiser, Hoffman Estates, Ill.

[73] Assignee: Northrop Grumman Corporation, Los Angeles, Calif.

[21] Appl. No.: 370,052

[22] Filed: Jan. 9, 1995

[51] Int. Cl.⁶ .................................................. G01S 13/00
[52] U.S. Cl. ........................ 342/159; 342/59; 342/147
[58] Field of Search ............................ 342/159, 59, 147

[56] References Cited

U.S. PATENT DOCUMENTS

| | | | |
|---|---|---|---|
| Re. 32,368 | 3/1987 | Funatsu et al. ................ | 342/45 |
| 3,911,432 | 10/1975 | Williams ........................ | 343/5 |
| 3,981,014 | 9/1976 | Masak ............................ | 343/100 |
| 4,010,468 | 3/1977 | Fishbein et al. ............... | 343/7.5 |
| 4,051,474 | 9/1977 | Mack et al. .................... | 343/100 |
| 4,105,977 | 8/1978 | Fitting et al. ................. | 325/472 |
| 4,123,755 | 10/1978 | Fishbein et al. .............. | 343/17.1 |
| 4,214,244 | 7/1980 | McKay et al. ................. | 343/18 |
| 4,320,535 | 3/1982 | Brady et al. .................. | 455/278 |
| 4,403,220 | 9/1983 | Donovan ........................ | 343/6 |
| 4,516,126 | 5/1985 | Masak et al. .................. | 343/383 |
| 4,613,862 | 9/1986 | O'Donnell ..................... | 343/17.1 |
| 4,780,721 | 10/1988 | Dobson .......................... | 342/178 |
| 4,893,350 | 1/1990 | Minamisono et al. .......... | 455/278 |
| 4,994,809 | 2/1991 | Yung et al. ..................... | 342/108 |
| 5,314,037 | 5/1994 | Shaw et al. .................... | 180/169 |
| 5,371,506 | 12/1994 | Yu et al. ........................ | 342/380 |

*Primary Examiner*—J. Woodrow Eldred
*Attorney, Agent, or Firm*—Terry J. Anderson; Karl J. Hoch, Jr.

[57] ABSTRACT

A method for mitigating interference among a plurality of radar sets utilizes the steps of: determining the direction in which a radar antenna is pointing; selecting one of a plurality of different non-interfering radar signals based upon the direction that the radar antenna is pointing, each different non-interfering radar signal beam dedicated to a particular direction of the radar antenna; and utilizing the selected radar signal. Radar antennae pointed toward one another do not interfere with one another since they are both using different non-interfering radar signals.

10 Claims, 1 Drawing Sheet

RADAR SIGNAL SELECTION BASED UPON ANTENNA BEARING

FIELD OF THE INVENTION

The present invention relates generally to radar and more particularly to a method for mitigating interference among a plurality of radar sets.

BACKGROUND OF THE INVENTION

Radar, as used in collision avoidance, weather, and reconnaissance, is well known. It is believed that in the near future radar will additionally be utilized on trucks and automobiles for intelligent cruise control, collision avoidance, and other navigational functions.

However, once radar is implemented on a wide scale for such purposes, the potential for mutual interference among nearby radar sets becomes substantial.

In co-located radar systems, i.e., wherein both the receiving and transmitting antenna share a common location, signals from other, nearby transceivers may potentially interfere substantially with one another unless specific methods are utilized so as to mitigate such interference.

Typically, a directional antenna is used so as to reduce the potential for such interference by greatly attenuating those signals which are not received within the directional antenna's main beam. However, the potential for interference substantially increases when an interfering radar transceiver is located within the antenna's main beam.

As such, it is beneficial to provide means for mitigating interference among proximate radar sets when the positioning of one radar set within the main beam of another radar set cannot be avoided. This situation would be prevalent on roadways wherein automobiles would frequently be disposed ahead of each other's forward looking radar sets.

According to prior art methodology, orthogonal signals have been used in an attempt to mitigate such interference. The use of such orthogonal signals ideally provides a means for selecting a desired signal while rejecting co-resident (within the radar antenna's main beam), undesirable signals.

However, due to the limited number of such orthogonal signals, as discussed below, reliable use depends upon assuring that no two proximate radar sets utilize a common set of orthogonal signals. When such radar sets are independently operated (not responsive to a common controller), it is difficult to assure that each proximate radar set utilizes a unique orthogonal signal, so as not to cause such interference.

Orthogonal signals are defined herein to include signals constructed from a set of functions that cross-correlate to a small value and auto-correlate to a large value. This property facilitates the use of a matched filter (or correlation detector) to recognize one desired signal and attenuate all other signals within the function set. Thus, a radar set may easily discriminate between its own radar signal and potentially interfering proximate radar signals which are radiate into the radar set's main antenna beam.

The use of sinusoidal signals of differing frequencies comprises the most common use of orthogonal signals in radar. Matched filters, typically approximated via the use of simple bandpass filters, pass the desired frequency sinusoidal signal and reject sinusoidal signals of different frequencies.

It is well known in the art that several other orthogonal basis sets can be used for radar signals, as well. An example of some of these basis sets is provided below:

1. Sinusoids with differing frequencies;
2. Pulsed sinusoids with differing pulse repetition frequencies;
3. Pulsed sinusoids with pseudo-random pulse repetition frequencies;
4. Sinusoids with pseudo-random phase coding;
5. Sinusoids with pseudo-random frequency coding;
6. Walsh functions;
6. Cross-polarization; and
7. Various combinations of Items 1–6.

Radar systems that employ the use of such signal/matched filters from one of the aforementioned basis sets tend to minimize interference from other signals, particularly within the same basis set. However, in practice, due to bandwidth limitations or for other reasons, all basis sets only have a finite number of useable signals. Thus, individual functions or waveforms within a given basis set need to be reused when the number of required signals exceeds the finite number of useable signals.

Thus, when many radar sets are operated within close proximity such as in automobile applications, the potential exists for having another radar within a particular radar antenna's main beam which utilizes the same signal function, thus resulting in undesirable interference.

As such, it is beneficial to provide means for mitigating interference among radars sets utilizing orthogonal signal sets and directional antennae.

SUMMARY OF THE INVENTION

The present invention specifically addresses and alleviates the above-mentioned deficiencies associated with the prior art. More particularly, the present invention comprises a method for mitigating interference among a plurality of radar sets being operated within range of one another. The method comprises first determining the direction in which a directional radar antenna is pointing; selecting one of a plurality of different non-interfering radar signals based upon the direction that the radar antenna is pointing, each different non-interfering radar signal beam dedicated to a particular direction of the radar antenna; and utilizing the selected radar signal. Thus, radar antennae pointed toward one another do not interfere with one another since they are both using different non-interfering radar signals.

As used herein, the term direction is defined to include a range of direction, the range being dependent upon the resolution of the system and being generally dependent upon the number of orthogonal signals within the orthogonal signal set being utilized.

In two-dimensional or land/water based systems, the step of determining in which direction the directional radar antenna is pointing comprises determining the compass bearing of the radar antenna.

One of a plurality of orthogonal radar signals is utilized preferably based upon at least one of:

1. Sinusoids with differing frequencies;
2. Pulsed sinusoids with differing pulse repetition frequencies;
3. Pulsed sinusoids with pseudo-random pulse repetition frequencies;
4. Sinusoids with pseudo-random phase coding;
5. Sinusoids with pseudo-random frequency coding;
6. Walsh functions;
7. Cross-polarization; and 8. Various combinations of Items 1–6.

Those skilled in the art will appreciate that various other non-interfering types of radar signals are likewise suitable.

When one radar beam is pointed away from another radar beam, the directional antenna pattern provides sufficient attenuation to prevent interference. In this instance, the requirement for orthogonal signals is reduced or eliminated. However, since the present invention selects an orthogonal waveform for each radar signal based upon the compass bearing of the radar antenna, two radar sets which are pointed toward one another, i.e., having compass bearings of 180 degrees with respect to one another, have optimally orthogonal waveforms, and thus do not interfere with one another.

The orthogonal waveforms are preferably assigned to directions such that radar signals for directions 180 degrees apart from one another are optimally non-interfering. Thus, when two radars are pointed directly toward one another, they are utilizing orthogonal waveforms which have specifically been selected so as to minimize interference. As the angle between non-interfering waveforms decreases, pairs of waveforms which are less non-interfering may be utilized. Thus, for any given direction, the waveform associated with that particular direction is lease likely to interfere with the waveform associated with the opposite direction, i.e., that direction 180 degrees with respect thereto.

Preferably, an electronic compass is physically mounted to the radar antenna so as to sense the orientation thereof. However, those skilled in the art will appreciate that various different means for determining the compass bearing or direction of the antenna are likewise suitable.

The electronic compass preferably senses the direction in which the antenna is pointed and then transmits this information to a microprocessor. The microprocessor then selects an orthogonal signal based upon the antenna orientation or compass bearing.

For example, assuming that 360 different orthogonal signals are available within the chosen basis set, the microprocessor would select the 45th orthogonal signal when the radar antenna has a compass bearing of 45 degrees (North-East). Similarly, the microprocessor would select the 180th radar signal when the radar antenna has a compass bearing of 180 degree (South). Thus, as the radar antenna orientation changes, its signal waveform changes accordingly.

Thus, radar sets will have non-interfering orthogonal signals unless they point in the same compass direction. However, when this occurs a high front-to-back antenna pattern attenuation prevents interference. More significantly, radars pointed directly at one another cannot have the same orthogonal signal, since they inherently have different compass headings. Thus, according to the present invention, interference is substantially mitigated.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the function and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
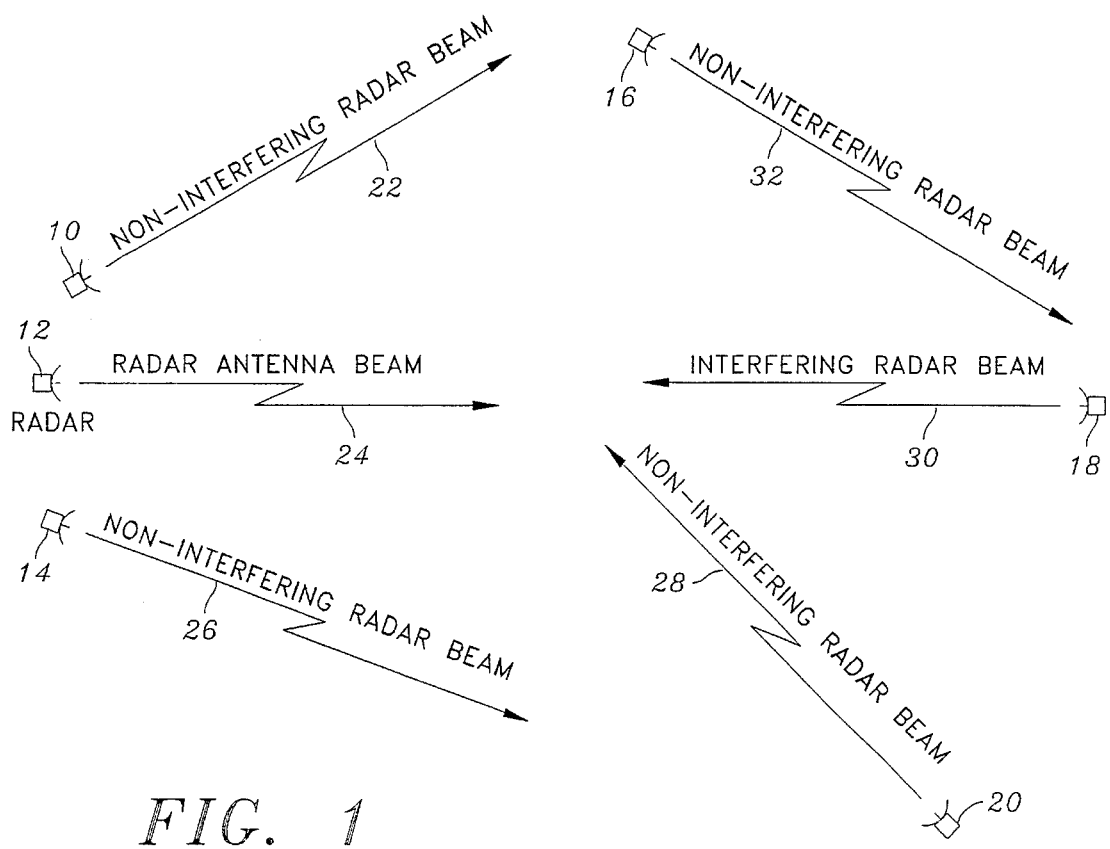
FIG. 1 is a plan view of a plurality of radar sets oriented at different directions with respect to one another, including one interfering pair of radar sets.
Figure 2:
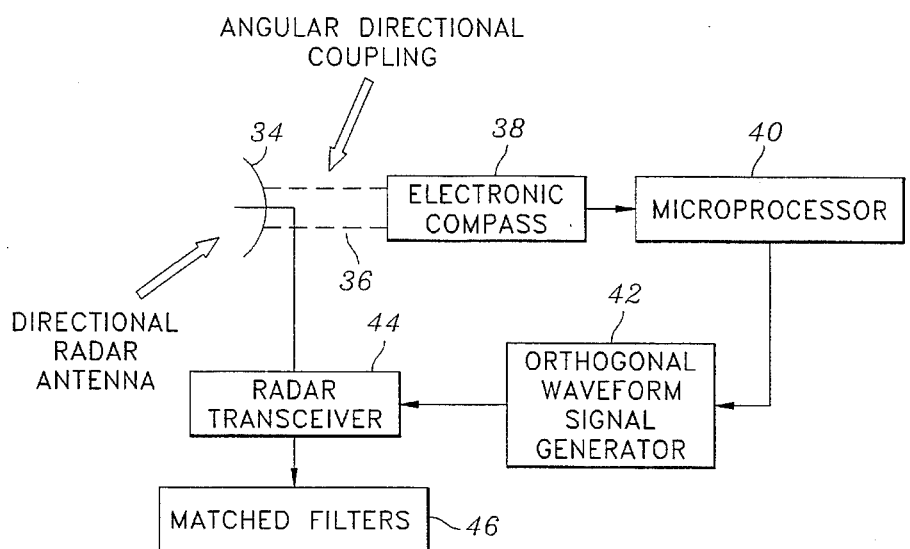
FIG. 2 is a schematic block diagram of the present invention.

The method of radar signal selection based upon directional radar antenna bearing of the present invention is illustrated in FIGS. 1 and 2 of the drawings which depict a presently preferred embodiment of the invention.

Referring now to FIG. 1, those orientations of two different radar beams which result in interference and those which result in non-interference are illustrated. Those radars which do not interfere with radar 12 are radars 10, 14, 16, and 20. Thus, only radar 18 interferes with radar 12.

Radar beam 22, radiated from radar 10, is radiated in a direction away from radar 12, and thus does not radiate sufficient energy in the direction of radar 12 to cause interference therewith. Similarly, radar beams 26 and 32, radiated from radars 14 and 16, respectively, are radiated in a direction away from radar 12 and thus do not significantly interfere therewith.

Although radar beam 28, radiated from radar 20, is radiated in the general direction of radar 12, the directional nature of the antennae utilized with radars 12 and 20 limit the amount of energy from radar beam 28 which is received by the antenna of radar 12, thus not allowing radar beam 28 to substantially interfere with radar 12.

However, radar 18 radiates radar beam 30 directly along the path of radar beam 24 radiated from radar 12, and thus directly toward radar 12. As such, radar beam 30 interferes substantially with radar 12, despite the directional nature of the radar antennae of radar 12 and radar 18, unless radars 12 and 18 utilize orthogonal signals.

Thus, it is necessary for the radar beams 24 and 30 of radars 12 and 18, respectively, to utilize orthogonal signals so as to avoid such interference. Such orthogonal signals are constructed from a set of functions that cross-correlate to a small value such that interfering signals may easily be isolated or filtered out.

Referring now to FIG. 2, means is illustrated for assuring that radars such as 12 and 18 of FIG. 1, which point directly toward one another, do not interfere with one another. According to the methodology of the present invention, a plurality of different orthogonal signals are each assigned to a unique compass bearing or range of compass bearings such that when two different radars are oriented such that they point generally toward one another, the use of different, i.e., non-interfering, orthogonal signals for the two different radars is guaranteed.

Thus, the present invention comprises a directional radar antenna 34 coupled, preferably via mechanical coupling 36, to an electronic compass 38. The electronic compass determines the angular direction or bearing, generally analogous to the azimuth, of the directional radar antenna 34. The bearing data is provided to a microprocessor 40 which then selects the appropriate orthogonal waveform signal from a predefined and preassigned set of orthogonal waveform signals. That is, each of a plurality of different orthogonal signals have been assigned to a unique compass bearing or range of compass bearings. Thus, for any specific antenna bearing or range of bearings, a specific and unique orthogonal waveform signal is selected. The same orthogonal waveform will be selected for any radar antenna pointed in the same direction and different orthogonal signals will be selected for radar antennae pointed in different directions. As the compass bearings of two radar sets approach 180 degrees with respect to one another, the radar signal becomes optimally non-interfering.

Those skilled in the art will appreciate that various different direction sensing devices, i.e., inertial platforms, star tracking devices, etc., may similarly be utilized, particularly in non-land based systems.

Microprocessor 40 provides a signal to orthogonal waveform signal generator 42 so as to cause orthogonal waveform signal generator 42 to generate the selected orthogonal waveform signal which is then provided to radar transceiver 44 and transmitted via directional radar antenna 34.

Undesirable interfering signals orthogonal to the selected orthogonal waveform signal are discarded by matched filters 46. Such orthogonal signals cross-correlate to a small value, while the desirable originally transmitted orthogonal signal auto-correlates to a large value, thus enabling such filtering or correlation detection.

Thus, the present invention provides means for substantially mitigating interference among a plurality of radars. The methodology of the present invention is particularly useful in those instances wherein a large number of radars are utilized within close proximity. For example, use of the present invention makes it possible to utilize radar upon trucks and automobiles for such applications as intelligent cruise control, collision avoidance, and various other navigational functions, without interference from nearby radar sets which are oriented toward one another.

It is understood that the exemplary method and apparatus for radar signal selection based upon antenna bearing described herein and shown in the drawings represents only a presently preferred embodiment of the invention. Indeed, various modifications and additions may be made to such embodiment without departing from the spirit and scope of the invention. For example, those skilled in the art will appreciate that various different types of orthogonal signals and combinations thereof are suitable for use in the present invention. Also, various different types of directional antenna are anticipated. Also, the use of various different non-radar, radiated energy beams, e.g., laser, are likewise anticipated. Thus, as used herein, the term radar is broadly defined to include all such radiated energy beams. Indeed the present invention may be utilized with various optical and other electromagnetic technologies. The present invention may be used in various different land based, marine, and airborne applications, including private, commercial, and military applications.

Thus, these and other modifications and additions may be obvious to those skilled in the art and may be implemented to adapt the present invention for use in a variety of different applications.

What is claimed is:

1. A method for mitigating interference among a plurality of radar sets, said method comprising the steps of:
   a) determining the direction in which a directional radar antenna is pointing;
   b) selecting one of a plurality of different non-interfering radar signals based upon the direction that the radar antenna is pointing, each different non-interfering radar signal being dedicated to a particular direction of the radar antenna; and
   c) utilizing the selected radar signal;
   d) wherein radar antennae pointed toward one another do not interfere with one another since they are both using different non-interfering radar signals.

2. The method as recited in claim 1 wherein the step of determining the direction in which the directional radar antenna is pointing comprises determining the compass bearing of the radar antenna.

3. The method as recited in claim 1 wherein the step of selecting a plurality of different non-interfering radar signals comprises selecting one of a plurality of orthogonal radar signals, the orthogonality being based upon at least one of:
   a) sinusoidal carrier frequency;
   b) pulse repetition frequency of a pulsed sinusoidal signal;
   c) pseudo-random pulse repetition frequency coding of a pulse-sinusoidal signal;
   d) pseudo-random phase coding of a sinusoidal signal;
   e) pseudo-random frequency coding of a sinusoidal signal;
   f) Walsh functions; and
   g) cross-polarization.

4. The method as recited in claim 1 wherein non-interfering radar signals are assigned to directions such that radar signals for directions 180 degrees apart are optimally non-interfering.

5. A radar system for mitigating interference among a plurality of radar sets, each radar set comprising:
   a) a directional antenna; and
   b) a direction sensor for sensing the orientation of said antenna;
   c) a signal selector for selecting one of a plurality of different non-interfering radar signals based upon the direction that the radar antenna is pointing, each different non-interfering radar signal being dedicated to a particular direction of the radar antenna; and
   d) a radar transceiver for transmitting the selected radar signal through said direction antenna and for receiving the return radar signal through said directed antenna;
   e) wherein two such radar antennae pointed toward one another do not interfere with one another since they are not pointed in the same direction and thus are both using different non-interfering radar signals.

6. The radar system as recited in claim 5, wherein said direction sensor is mechanically coupled to said directional antenna.

7. The radar system as recited in claim 5 wherein said direction sensor is configured to sense the compass bearing of said directional antenna.

8. The radar system as recited in claim 5 wherein said direction sensor comprises a compass.

9. The radar system as recited in claim 5 wherein said signal selector selects one of a plurality of orthogonal radar signals based upon at least one of:
   a) sinusoidal carrier frequency;
   b) pulse repetition frequency coding of a pulsed sinusoidal signal;
   c) pseudo-random pulse repetition frequency coding of a pulsed-sinusoidal signal;
   d) pseudo-random phase coding of a sinusoidal signal;
   e) pseudo-random frequency coding of a sinusoidal signal;
   f) Walsh functions; and
   g) cross-polarization.

10. A radar set comprising:

a) a directional antenna;

b) an electronic compass coupled to said directional antenna for determining the compass bearing thereof;

c) a microprocessor responsive to said electronic compass for selecting one of a plurality of different orthogonal radar signals; and d) an orthogonal waveform signal generator for generating the selected orthogonal radar signal;

e) a radar transceiver for transmitting and receiving the selected orthogonal radar signal via said directional antenna;

f) wherein two such radar antennae pointed toward one another do not interfere with one another since they are not pointed in the same direction and thus are both using different non-interfering radar signals.

* * * * *